US006499112B1

United States Patent
Milillo et al.

(10) Patent No.: US 6,499,112 B1
(45) Date of Patent: Dec. 24, 2002

(54) AUTOMATIC STAND ALONE RECOVERY FOR PEER TO PEER REMOTE COPY (PPRC) OPERATIONS

(75) Inventors: Michael Steven Milillo, Louisville, CO (US); David G. Hostetter, Boulder, CO (US); Brad David Privratsky, Thornton, CO (US); Jennifer T. Johnson, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/537,698

(22) Filed: Mar. 28, 2000

(51) Int. Cl.$^7$ ................................................. H02H 3/05
(52) U.S. Cl. ........................... 714/6; 711/161; 711/114
(58) Field of Search ........................ 714/6, 7, 42, 710, 714/15; 711/114, 161, 162, 170; 707/204; 710/38

(56) References Cited

U.S. PATENT DOCUMENTS

| | | | |
|---|---|---|---|
| 5,615,329 A | * | 3/1997 | Kern et al. ..................... 714/6 |
| 5,692,155 A | | 11/1997 | Ishiyan et al. |
| 6,237,008 B1 | * | 5/2001 | Beal et al. .................. 707/204 |
| 6,304,980 B1 | * | 10/2001 | Beardsley et al. .......... 707/204 |
| 6,442,709 B1 | * | 8/2002 | Beal et al. .................. 709/208 |
| 6,446,175 B1 | * | 9/2002 | West et al. ................. 711/161 |

FOREIGN PATENT DOCUMENTS

EP          0 671 686 A      9/1995

OTHER PUBLICATIONS

"Direct and Indirect Addressing of Peripheral Devices" IBM Technical Disclosure Bulletin, IBM Corp., New York, US, vol. 33, No. 1A, Jun. 1, 1990, pp. 475–477, XP000117807.

* cited by examiner

Primary Examiner—Robert Beausoliel
Assistant Examiner—Rita A Ziemer
(74) Attorney, Agent, or Firm—Brooks & Kushman P.C.

(57) ABSTRACT

A method for use in a peer to peer remote copy (PPRC) system having primary and secondary storage systems to make data available from established PPRC storage volume pairs includes isolating the secondary storage system to be in a stand alone state such that access from any storage systems and hosts is prevented. It is then determined if each storage volume of the secondary storage system is part of an established PPRC storage volume pair. Each established PPRC storage volume pair is then terminated such that the storage volumes of the secondary storage system that are part of the established PPRC storage volume pairs are accessible to hosts. The secondary storage system is then made available to hosts to effect data recovery of the established PPRC storage volumes.

11 Claims, 3 Drawing Sheets

AUTOMATIC STAND ALONE RECOVERY FOR PEER TO PEER REMOTE COPY (PPRC) OPERATIONS

TECHNICAL FIELD

The present invention relates generally to peer-to-peer remote copy (PPRC) methods and systems and, more particularly, to a method and system for performing automatic stand alone recovery of secondary storage volumes for peer to peer remote copy (PPRC) operations.

BACKGROUND ART

With increasingly large amounts of data being handled in data processing systems, storage systems, such as disk storage systems are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed to minimize the time in which access to data is lost due to a disaster.

Peer-to-peer remote copy (PPRC) is a synchronous copy mechanism that creates a copy of data at a remote or secondary storage system. This copy, at the secondary storage system, is kept current with the data located at the primary storage system. In other words, a copy of the data located at the secondary storage system is kept in sync with the data at the primary storage system as observed by the user of the data. Volume pairs are designated in which a volume in the primary storage system is paired with a volume in the secondary storage system.

With a PPRC system, a PPRC data copy to the recovery or secondary storage system occurs synchronously from the primary host point of view with write operations to volumes in the primary storage system. Paths connect the primary storage system to the secondary storage system. When data is written from a primary host to the primary storage system, the data written to a primary volume is also written by the primary storage system to a corresponding volume in the secondary storage system using a path to the secondary storage system.

In effect, the primary volume data is replicated to a corresponding secondary volume and the two volumes are kept in sync when writes are sent to the primary volume. It is the responsibility of the primary storage system to send all primary volume writes to the corresponding secondary volume of the secondary storage system. It is the responsibility of the secondary storage system to disallow any read or write accesses by any hosts to the secondary volume while the secondary volume is dedicated as secondary storage. These actions keep the content of the primary and secondary volumes identical.

When access to the primary volume data of the primary storage system is lost, the secondary volume data of the secondary storage system is needed for recovery. In current peer to peer remote copy (PPRC) operations, issuing a "recover" command from a host to a secondary volume of the secondary storage system allows read/write access to the secondary volume. The recover commands tell the secondary storage system that the PPRC primary and secondary volume pair relationships are terminated and that a host can have full access to the secondary volumes in the secondary storage system.

With this approach there has to be a secondary host connected to the secondary storage system to issue the recover commands. In effect, there has to be at least one volume of the secondary storage system accessible to the secondary host. This is a problem because many users desire a host at the remote secondary storage system site be connected to the secondary storage system only during a recovery operation. Many users also desire all of the volumes of the secondary storage system to be available as secondary volumes for PPRC operations and do not want to have at least one volume restricted for secondary host access during PPRC operations.

A problem is that a remote host cannot access the secondary volumes until the remote host issues the recover commands. The recover commands cannot be issued until the secondary volumes are online. To bring a volume online requires read/write commands that are rejected by the secondary storage system while the volumes of the secondary storage system are secondary storage volumes. Consequently, a secondary host has to be connected to the secondary storage system at all times including recovery and non-recovery time periods. What is needed is a method and system for performing automatic stand alone recovery of secondary volumes for peer to peer remote copy (PPRC) operations such that a host does not need to be connected to the secondary storage system.

SUMMARY OF THE INVENTION

Accordingly, it is an object of the present invention to provide a method and system for performing automatic stand alone recovery of secondary volumes for PPRC operations.

It is another object of the present invention to provide a method and system for performing automatic stand alone recovery of secondary volumes for PPRC operations such that a host does not need to be connected to the secondary storage system.

It is a further object of the present invention to provide a method and system for performing automatic data stand alone data recovery of secondary volumes for PPRC operations such that none of the volumes of a secondary storage system have to be accessible to the secondary host during PPRC operations and, as a result, all volumes of the secondary storage system are available to be secondary volumes.

In carrying out the above objects and other objects, the present invention provides a method for use in a PPRC system having a primary storage system including storage volumes and a secondary storage system including storage volumes. The storage volumes of the primary storage system correspond to respective storage volumes of the secondary storage system to form established PPRC storage volume pairs in which data written on primary storage volumes is automatically written on to the corresponding secondary storage volumes. The storage volumes of the secondary storage system that are part of the established PPRC storage volume pairs are only accessible to receive the data written on to the corresponding primary storage volume. The method makes data available from established PPRC storage volumes of the secondary storage system. The method includes isolating the secondary storage system to be in a stand alone state such that access from any storage systems and hosts is prevented. It is then determined if each storage volume of the secondary storage system is part of an established PPRC storage volume pair. Each established PPRC storage volume pair is then terminated such that the storage volumes of the secondary storage system that are part of the established PPRC storage volume pairs are accessible to hosts. The secondary storage system is then made available to hosts to effect data recovery of the established PPRC storage volumes.

In carrying out the above objects and other objects, the present invention further provides a peer to peer remote copy system in accordance with the method of the present invention.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
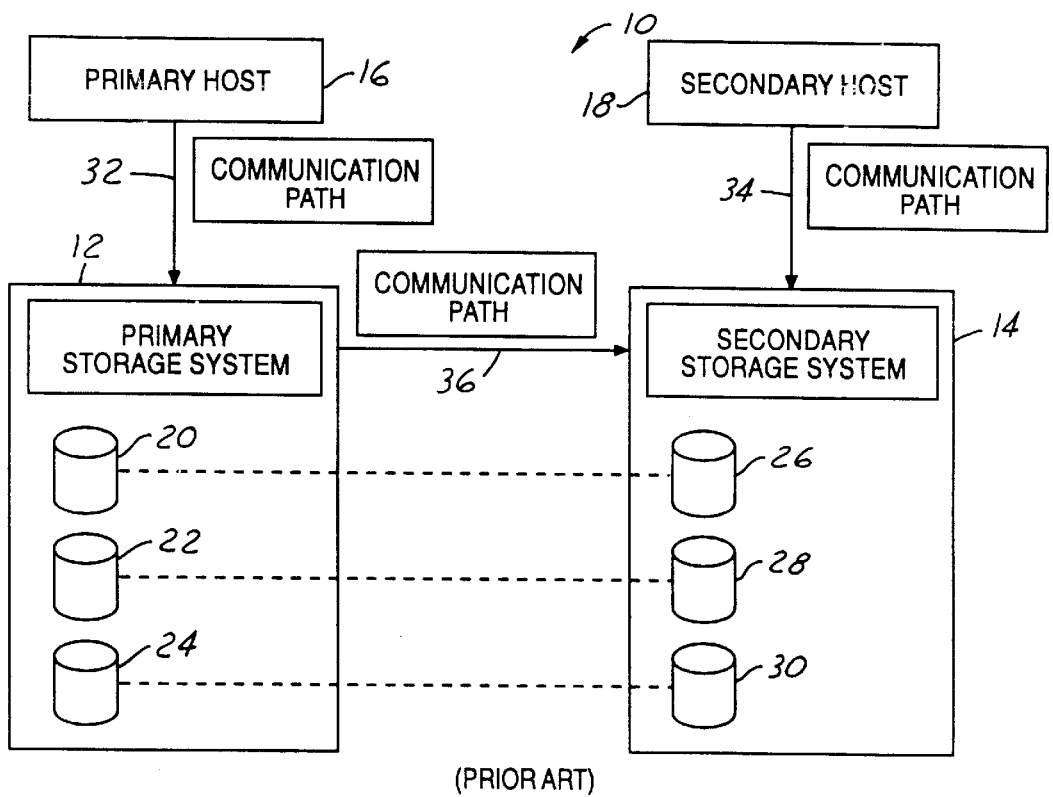
FIG. 1 illustrates a prior art peer to peer remote copy (PPRC) system.

Referring now to FIG. 1, a prior art peer to peer remote copy (PPRC) system 10 is shown. PPRC system 10 includes a primary storage system 12 and a secondary storage system 14. PPRC system further includes a primary host 16 connected to primary storage system 12 and a secondary host 18 connected to secondary storage system 14. Primary host 16 stores data in primary storage system 12. Data written to primary storage system 12 is copied to secondary storage system 14. The copy process creates a copy of the data from primary storage system 12 into secondary storage system 14. The copy process is a PPRC mechanism. In PPRC system 10, a write made by primary host 16 is considered complete only after the data written to primary storage system 12 also is written to secondary storage system 14. Primary and secondary hosts 16 and 18 may take various forms, such as a server on a network, a Web server on the Internet, or a mainframe computer. Primary storage system 12 and secondary storage system 14 are disk systems in these examples.

A communication path 32 connects primary host 16 to primary storage system 12. A communication path 34 connects secondary host 18 to secondary storage system 14. A communication path 36 connects primary storage system 12 with secondary storage system 14. Communication paths 32, 34, and 36 may take various forms, such as, for example, a local area network (LAN), a wide area network (WAN), the Internet, or an intranet. Communication paths 32, 34, and 36 contain various links, such as, for example, fiber optic lines, packet switched communication links, enterprise systems connection (ESCON) fibers, small computer system interface (SCSI) cable, and wireless communication links.

PPRC system 10 is an example of a data processing system in which the present invention may be implemented and not as an architectural limitation to the present invention. For example, primary host 16 and primary storage system 12 may be connected directly while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by primary host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28.

Figure 2:
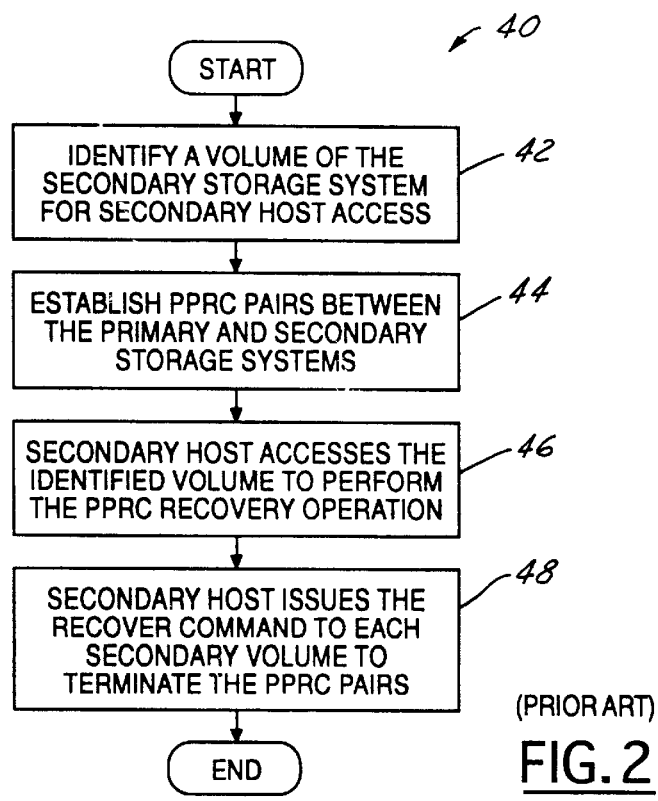
FIG. 2 illustrates a flow chart describing operation of the prior art PPRC system.

Referring now to FIG. 2, with continual reference to FIG. 1, a flow chart 40 illustrating prior art operation of PPRC system 10 is shown. Initially, it is noted that the prior art operation of PPRC system 10 requires that secondary host 18 be connected to secondary storage system 14 via communication path 34. Further, it is noted that secondary host 18 needs to have access to a storage volume of secondary storage system 14 to generally access the secondary storage system.

The prior art operation begins with identifying a secondary storage volume of secondary storage system 14 that is accessible to secondary host 18 as shown in block 42. PPRC storage pairs between primary storage system 12 and secondary storage system 14 are then established as shown in block 44. An established PPRC pair consists of a primary storage volume and a corresponding secondary storage volume. It is noted that not all of the secondary storage volumes can be established as PPRC pairs because secondary host 18 must access at least one volume (i.e., the identified volume) of secondary storage system 14. The identified volume cannot be accessed by secondary host 18 if the identified volume were to become a secondary storage volume.

Secondary host 18 then accesses the identified volume of secondary storage system 14 to perform the PPRC recovery operation as shown by block 46. Secondary host 18 then issues the recover command to each secondary volume in order to terminate the PPRC pairs as shown by block 48. Once a PPRC pair is terminated, secondary host 18 can access the secondary storage volume of the terminated PPRC pair. The prior art operation of PPRC system 10 requires a secondary host 18 to be connected to secondary storage system 14 during operation. The prior art operation of PPRC system 10 also requires at least one storage volume of secondary storage system 14 to be accessible to secondary host 18 and, consequently, the at least one volume cannot be a secondary storage volume.

Figure 3:
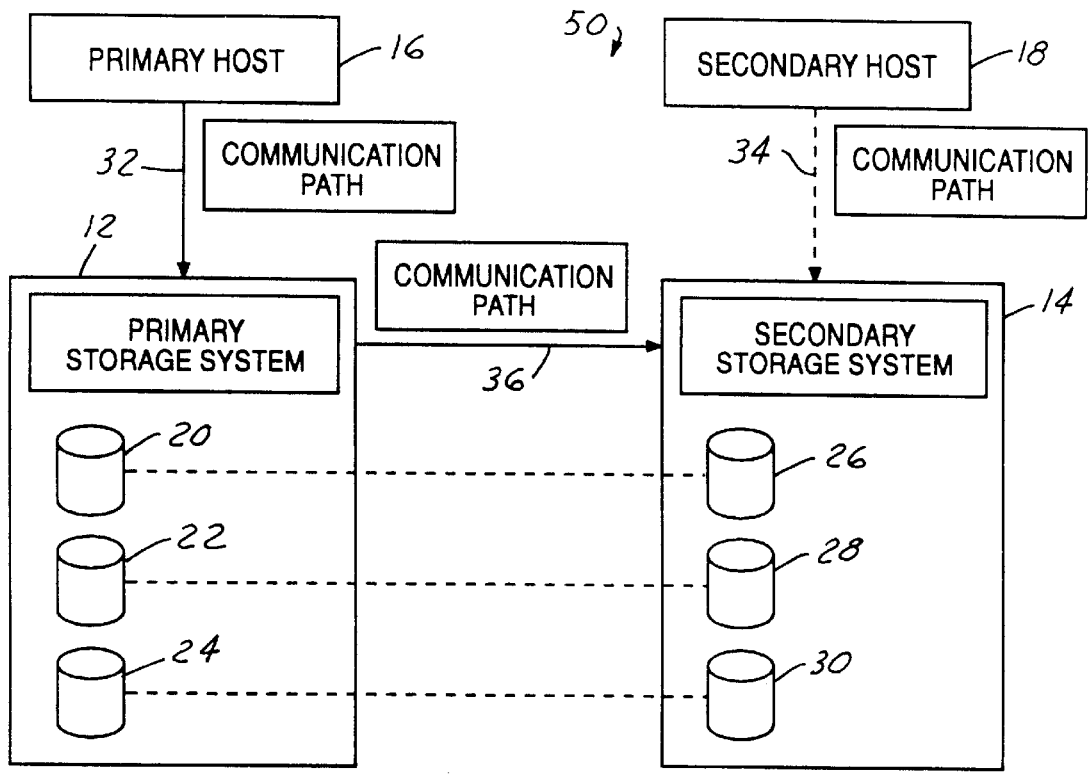
FIG. 3 illustrates a PPRC system in accordance with the present invention.

Referring now to FIG. 3, with continual reference to FIG. 1, a PPRC system 50 in accordance with the present invention is shown. PPRC system 50 functions similar to PPRC system 10 and includes like elements designated by identical reference numerals. PPRC system 50 is different than PPRC system 10 in that a secondary host may not be connected with secondary storage system 14 during PPRC operations. This is advantageous over prior art PPRC system 10 because a host located at the remote or secondary site may be performing other tasks during PPRC operations. In contrast, the prior art PPRC system 10 requires secondary host 18 to remain connected to secondary storage system 14 including those times when PPRC operations are taking place. PPRC system 50 also functions differently than PPRC system 10 in that none of the storage volumes of secondary storage system 14 need to be made available to secondary host 18 during PPRC operations. Accordingly, all of the storage volumes 26, 28, and 30 of secondary storage system 14 can be designated as secondary storage volumes.

Figure 4:
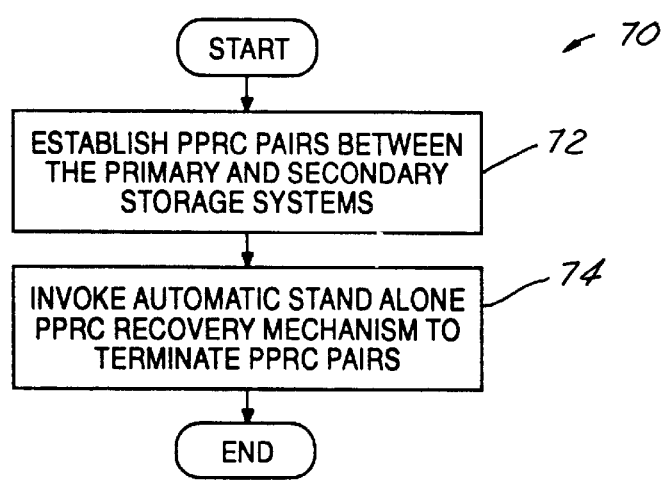
FIG. 4 illustrates a flow chart describing operation of the PPRC system in accordance with the present invention.

Referring now to FIG. 4, with continual reference to FIG. 3, a flow chart 70 illustrating operation of PPRC system 50 in accordance with the present invention is shown. The operation of PPRC system 50 begins with establishing PPRC storage volume pairs between primary storage system 12 and secondary storage system 14 as shown by block 72. It is noted that unlike prior art PPRC system 10, all storage volumes of secondary storage volume can be established as PPRC pairs. To perform PPRC recovery of secondary storage system 14, the automatic stand alone PPRC recovery mechanism of the present invention is invoked as shown by block 74. The automatic stand alone PPRC recovery mechanism causes all established PPRC primary and secondary storage volume pairs to be terminated, i.e., the relationships between the primary storage volumes and the secondary storage volumes are broken. Once the established PPRC volume pairs are terminated, a host can be attached to secondary storage system 14 and access the storage volumes of the secondary storage system.

Figure 5:
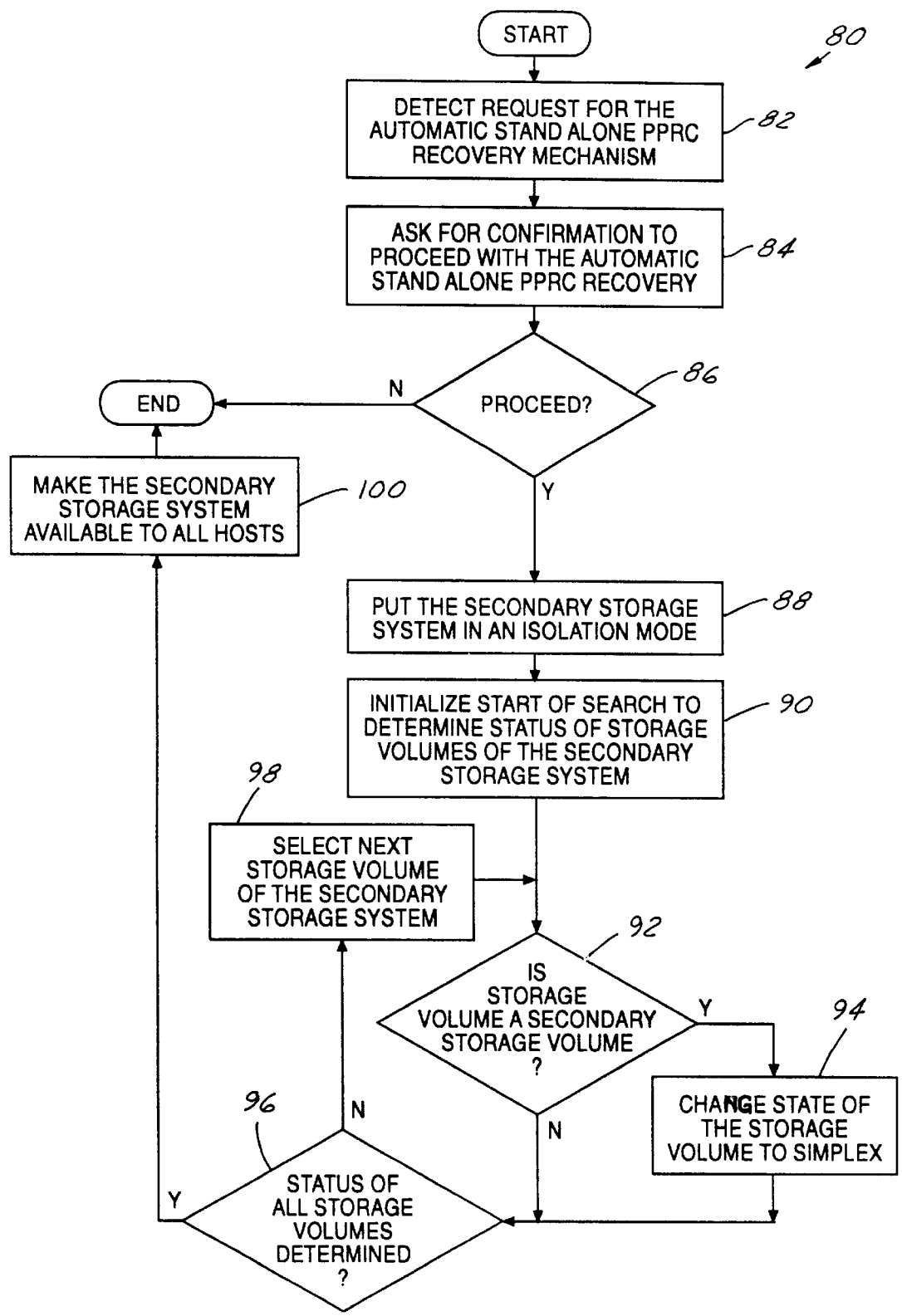
FIG. 5 illustrates a flow chart describing operation of the automatic stand alone PPRC recovery mechanism of the present invention.

Referring now to FIG. 5, with continual reference to FIGS. 3 and 4, a flow chart 80 describing operation of the automatic stand alone PPRC recovery mechanism of the present invention is shown. The operation of the automatic stand alone PPRC recovery mechanism begins with detecting a request for the automatic stand alone PPRC recovery mechanism at secondary storage system 14 as shown by block 82. Preferably, secondary storage system 14 includes a button or the like which can be actuated to invoke the automatic stand alone PPRC recovery mechanism. In response to detecting a request for the automatic stand alone PPRC recovery mechanism, secondary storage system 14 asks for confirmation to proceed with the automatic stand alone PPRC recovery as shown by block 84. Preferably, secondary storage system 14 asks an operator for confirmation. The operation then decides to enter the automatic stand alone PPRC recovery mode as shown by decision block 86.

If the automatic stand alone PPRC recovery is authorized to proceed, then secondary storage system 14 enters an isolation mode as shown by block 88. The isolation mode causes secondary storage system 14 to disallow any accesses to the secondary storage system, i.e., stand alone. In effect, in the isolation mode, secondary storage system 14 is isolated from all other hosts and storage systems. The state of the storage volumes of the secondary storage system cannot be changed because any establish pair or terminate pair commands cannot be active in the isolation mode. Secondary storage system 14 is then initialized to select a first storage volume of the secondary storage system to determine its status as shown by block 90. The status of the storage volumes of secondary storage system 14 is either a secondary storage volume or a non-secondary storage volume. A secondary storage volume has a corresponding primary storage volume and is part of an established PPRC pair. A non-secondary storage volume does not have a corresponding primary storage volume and it is not part of an established PPRC pair.

The selected first storage volume of secondary storage system 14 is then examined to determine if it is a secondary storage volume as shown by decision block 92. If the first storage volume is a secondary storage volume, then the state of the first storage volume is changed to simplex and its established PPRC volume pair status is terminated, i.e., the relationship between the first storage volume and its corresponding primary storage volume is broken, as shown by block 94. The storage volumes of secondary storage system 14 that are in the simplex mode can be accessed by hosts. Decision block 96 then determines if the status of all storage volumes of secondary storage system 14 has been determined. If not, then the next storage volume after the first storage volume of secondary storage system 14 is selected as shown by block 98. The process represented by blocks 92, 94, 96, and 98 then continues until the status of all or a selected subset of the storage volumes of secondary storage system 14 has been determined. Each secondary storage volume is changed to the simplex state. After all secondary storage volumes of secondary storage system 14 have been changed to the simplex state, the secondary storage system is made available to all hosts and storage systems as shown by block 100 to effect the PPRC recovery operation.

Thus it is apparent that there has been provided, in accordance with the present invention, a method and system for performing automatic stand alone recovery of secondary volumes for PPRC operations that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a peer to peer remote copy (PPRC) system having a primary storage system including a plurality of storage volumes and a secondary storage system including a plurality of storage volumes, wherein storage volumes of the primary storage system correspond to respective storage volumes of the secondary storage system to form established PPRC storage volume pairs in which data written on primary storage volumes is automatically written on to the corresponding secondary storage volumes, wherein the storage volumes of the secondary storage system that are part of the established PPRC storage volume pairs are only accessible to receive the data written on to the corresponding primary storage volume, a method for making data available from established PPRC storage volumes of the secondary storage system, the method comprising:

isolating the secondary storage system to be in a stand alone state such that access from any storage systems and hosts is prevented;

determining if each storage volume of the secondary storage system is part of an established PPRC storage volume pair;

terminating each established PPRC storage volume pair such that the storage volumes of the secondary storage system that are part of the established PPRC storage volume pairs are accessible to hosts; and making the secondary storage system available to storage systems and hosts to effect data recovery of the established PPRC storage volumes.

2. The method of claim 1 further comprising:

invoking a request to the secondary storage system to enter the stand alone state to perform data recovery of the established PPRC storage volumes.

3. The method of claim 1 wherein:

terminating each established PPRC storage volume pair includes changing the state of the storage volumes of the secondary storage system to simplex.

4. The method of claim 1 wherein:

the primary storage volumes and the secondary storage volumes are physical devices.

5. The method of claim 4 wherein:

the physical devices are disk drives.

6. The method of claim 1 wherein:

the primary storage volumes and the secondary storage volumes are virtual devices.

7. A peer to peer remote copy system comprising:

a primary storage system including a plurality of storage volumes; and a secondary storage system including a plurality of storage volumes, wherein storage volumes of the primary storage system correspond to respective storage volumes of the secondary storage system to form established PPRC storage volume pairs in which data written on primary storage volumes is automatically written on to the corresponding secondary storage volumes, wherein the storage volumes of the secondary storage system that are part of the established PPRC storage volume pairs are only accessible to receive the data written on to the corresponding primary storage volume;

wherein the secondary storage system is operable to be isolated to be in a stand alone state such that access from any storage systems and hosts is prevented, to determine if each storage volume of the secondary storage system is part of an established PPRC storage volume pair, to terminate each established PPRC storage volume pair such that the storage volumes of the secondary storage system that are part of the established PPRC storage volume pairs are accessible to hosts, and to be available to hosts and storage systems to effect data recovery from established PPRC storage volumes of the secondary storage system.

8. The system of claim 7 wherein:

the secondary storage system is operable to terminate each established PPRC storage volume pair by changing the state of the storage volumes of the secondary storage system to simplex.

9. The system of claim 7 wherein:

the primary storage volumes and the secondary storage volumes are physical devices.

10. The system of claim 9 wherein:

the physical devices are disk drives.

11. The system of claim 7 wherein:

the primary storage volumes and the secondary storage volumes are virtual devices.

* * * * *